Aug. 15, 1939.                J. BELLEGANTE                    2,169,628
                        REEL ATTACHMENT FOR HAY MOWERS
                          Filed May 25, 1938         2 Sheets-Sheet 1
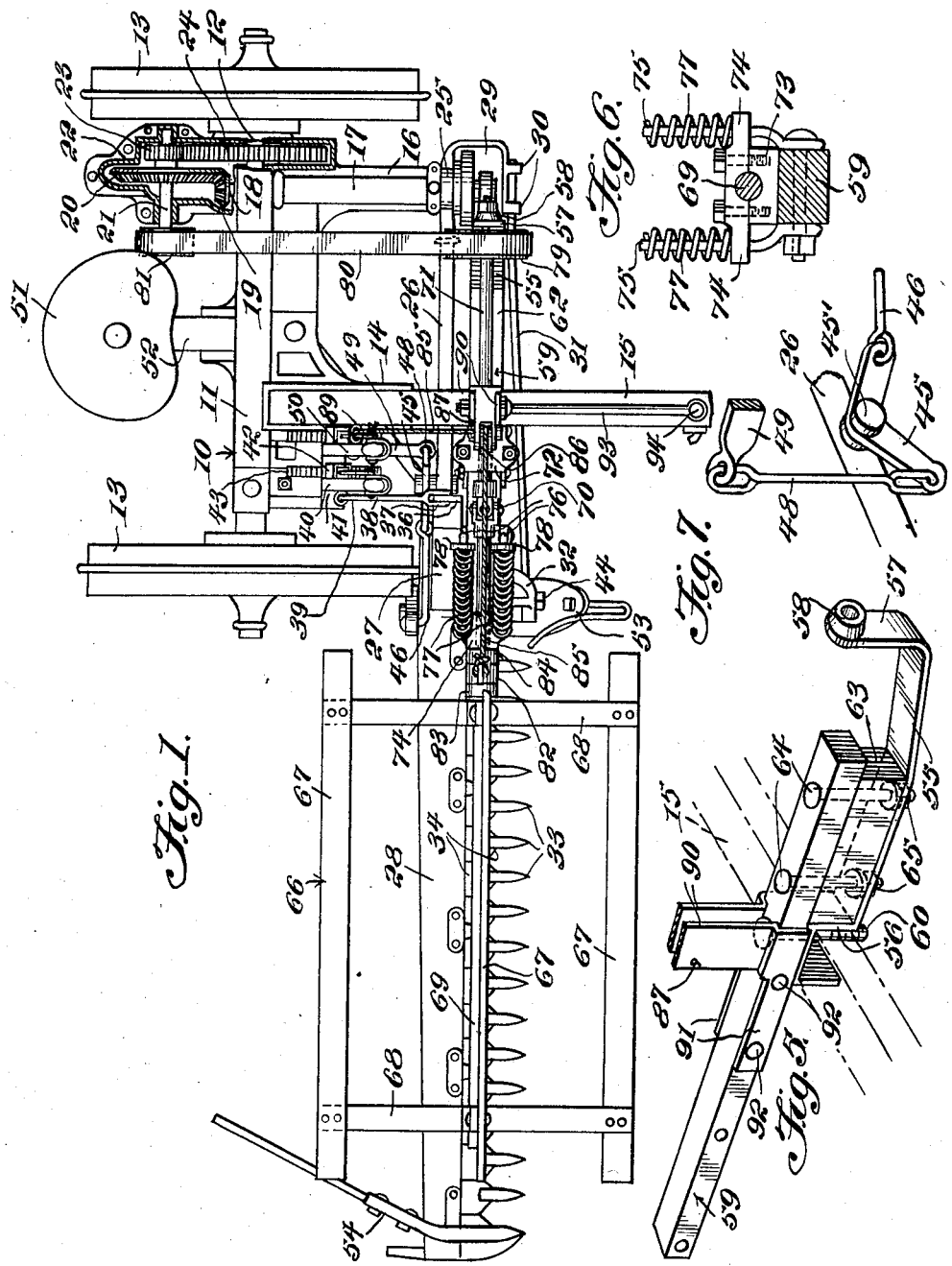

Aug. 15, 1939.  J. BELLEGANTE  2,169,628
REEL ATTACHMENT FOR HAY MOWERS
Filed May 25, 1938  2 Sheets-Sheet 2
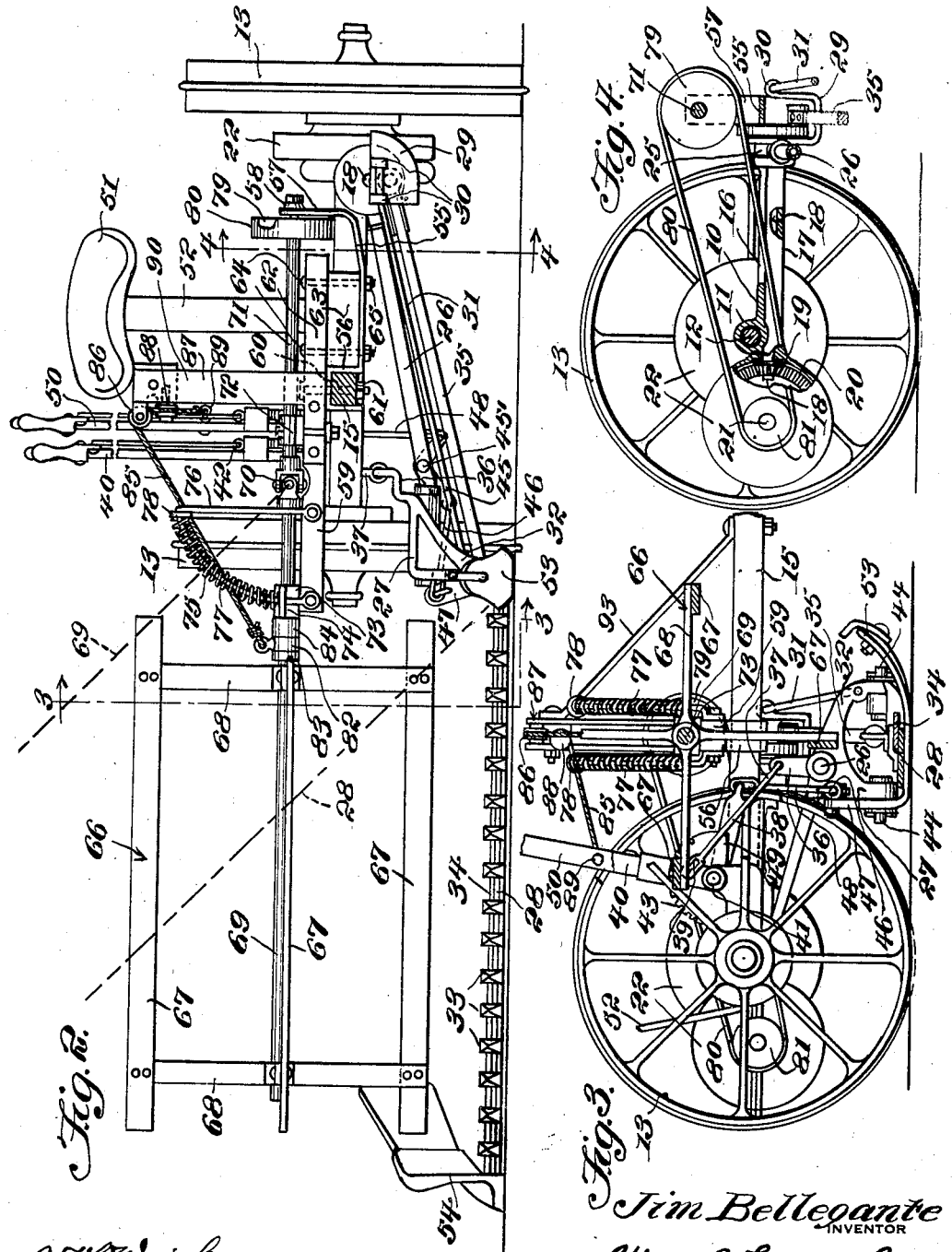

Patented Aug. 15, 1939

2,169,628

UNITED STATES PATENT OFFICE 2,169,628

REEL ATTACHMENT FOR HAY MOWERS

Jim Bellegante, Glenns Ferry, Idaho

Application May 25, 1938, Serial No. 210,071

2 Claims. (Cl. 56—222)

This invention relates to reel attachments for hay mowers and the like, the prime object being to provide a simple and inexpensive yet practical and efficient device which is readily attachable to an ordinary mowing machine.

Another object is to provide a novel pivotal mounting for the reel and a correlated special operating and controlling mechanism which is readily incorporated with the operating mechanism for the cutting unit of the machine whereby said unit and the reel are simultaneously actuated.

A further object is to provide for the simultaneous raising and lowering of the reel with the cutting unit.

With the foregoing and other objects and advantages to be attained, as will hereinafter more fully appear, the invention consists in the general structure and in the particular parts and combinations and arrangements of parts thereof, as hereinafter described and set forth in the appended claims, reference being had to the accompanying drawings illustrating a practical adaptation of the invention, and in which Figure 1 is a top plan view of a mowing machine with the reel attachment applied thereto, a portion of the gear casing being shown in section to expose certain of the gear elements;

Figure 2 is a front elevation of the machine;

Figure 3 is a section taken substantially on the line 3—3 of Figure 2;

Figure 4 is a section on the line 4—4 of Figure 2;

Figure 5 is a perspective view illustrating details of the supporting beam structure for the reel attachment;

Figure 6 is a fragmentary view on an enlarged scale, illustrating portions of the shaft mounting of the reel; and Figure 7 is a fragmentary view illustrating the details of the connection between the operating lever and the tilting means for the sickle bar.

Referring now to the drawings, the numeral 10 designates generally the main body frame of the mowing machine, on the transverse beam portion 11 of which the axle 12 is mounted, said axle having traction wheels 13 fixed on its opposite end portions in the usual manner. Extending forwardly from the transverse beam portion 11 of the body frame 10 is the usual rectangular bracket 14 in which the rear end portion of the draft tongue 15 is rigidly secured, said bracket extension 14, as shown, being located at one side of the longitudinal center of the machine between the traction wheels 13 in the direction in which the sickle bar is projected in operative position, whereby to equalize the draft pull on the tongue 15.

Extending forwardly from the transverse beam portion of the body frame, at the end thereof on the opposite side of said longitudinal center of the frame, is a rigid arm 16 having a tubular portion 17 through which a propeller shaft 18 extends, said propeller shaft having a beveled pinion 19 fixed on its rear end portion in mesh with a correspondingly beveled driving gear 20 on a counter shaft 21 journaled in a housing 22 secured to the body frame beam 11. The counter shaft 21 is provided with a pinion 23 in mesh with a large driving gear 24 fixed on the axle 12, this gearing being that which is usually provided for operating the cutting mechanism of the ordinary mowing machine.

Pivotally mounted on the forward end portion of the arm 16 of the body frame, as at 25, is a supporting arm 26 to the opposite end portion of which is rotatably attached a frame 27 on which the supporting plate or beam 28 for the sickle bar is pivotally mounted, as will be later described. As shown, the arm 26 is provided with a hollow bracket extension 29 which is formed integrally therewith, near its pivotal end portion 25, and said bracket extension 29 is provided with a pair of aligned ears 30 which are connected by a truss rod 31 to a forward extension 32 of the bracket frame 27, said parts so associated being relatively rotatable yet affording a stable support for the plate or beam member 28 of the cutting mechanism.

As conventionally shown, the supporting plate or beam 28 is provided along its forward edge portion with a multiplicity of spaced pointed lugs 33 in cooperative relation to the reciprocatory sickle bar 34 having the usual serrated forward cutting edge portion, said sickle bar being actuated by the pitman 35 which is pivotally attached at one end to the sickle bar 34 and having a crank connection at its opposite end with the propeller shaft 18.

In the general operation of a mowing machine of the character herein illustrated, the sickle bar is operated in a substantially horizontal position and close to the ground, but, under certain conditions, as when cutting along the face of an embankment, the supporting plate or beam 28 is raised at an angle of considerable inclination upwardly from its pivotal axis on the supporting frame bracket 27, and said bracket frame 27 is also rocked to different angular positions on the bar 26 for certain operations where it is necessary or desirable to accordingly set the sickle bar 34. For this purpose, means including operating levers located adjacent the drivers seat on the machine is provided. As shown, the rocking means for the supporting bracket frame 27 of the cutting mechanism includes an upstanding lever arm 36 on said bracket frame 27, said lever arm 36 having a pivotal attachment 37 to one end of a link 38 whose opposite end is pivotally attached, as at 39, to a hand lever 40 journaled, as at 41, on the body frame 10 laterally adjacent the tongue attaching bracket 14. This lever 40 is provided with the usual latch element 42 (not shown in detail) which cooperates with a toothed sector 43 whereby said lever may be locked in different operative positions and accordingly holds the bracket frame 27 in its respective rotated positions.

For effecting the tilting movement of the sickle supporting plate or beam 28 about its pivotal axis 44 on the bracket frame 27, a bell crank 45 is pivotally attached to said arm 26, as at 45', adjacent to said bracket frame 27, one arm of said bell crank 45 being connected by a link 46 to a crank arm 47 on said sickle bar supporting beam 28, the opposite arm of said bell crank 45 being connected by a link 48 to a lever arm 49 which extends forwardly from and coincident with the axis of a hand lever 50 located at the side of said hand lever 40 within convenient reach of the operator from the seat 51, which latter is mounted, as at 52, on the body frame 10 rearward of the transverse beam portion 11 thereof. Normally, the lever 50 is latched to a toothed sector similar to the sector 43 of the lever 40, but is releasable for operation in one direction to effect the actuation of the bell crank 45 when it is desired to swing the sickle bar upwardly on the pivotal axis 44 of its support.

The bracket frame 27 is provided with a ground shoe 53, while the sickle supporting plate or beam 28 is provided at its outer end with the usual swath divider 54, which parts are shown more or less conventionally, as are all the other parts hereinbefore described as to the cutting mechanism of the machine, which, obviously, may be of any approved construction and enters into the present invention not of itself but only in a general way in connection with the reel attachment and its operating and controlling means which will now be described.

In the illustrative structure of the reel attachment of the present invention, a transverse support is provided on the draft beam 15, said support, as shown, including a bracket 55 which is formed of a single flat metal bar, one end portion of which is rebent rectangularly, as at 56, to provide a substantially inverted U-shaped saddle to fit over the tongue 15, said bar being extended for some distance horizontally from the saddle portion 56, then at a slight upward incline and finally turned vertically upward, as at 57, the extreme upper end portion being provided with a bearing hub 58. Extending across the top of the saddle portion 56 of the metal bracket element 55 is an elongated wooden beam member 59 which is apertured vertically where it crosses the saddle portion 56 for the reception of a securing bolt 60 which is extended through aligned apertures in said saddle portion 56 and the underlying portion of the draft tongue 15, the lower end of said bolt 60 being provided with a securing nut 61. Between the horizontal portion of the bracket member 55 and the end portion 62 of the wooden beam member 59 is placed a filler block 63 which fastened to said bracket 55 and beam portion 62 by bolts 64 which are inserted through aligned openings in said parts and secured by nuts 65 provided on their lower ends.

The reel, designated generally by the numeral 66, may be of any desired construction, but, as shown, it comprises four blade members 67 which are carried by spiders 68 fixed on a supporting shaft 69, said shaft 69 being attached by a universal coupling 70 to a propeller shaft 71, which latter is journaled at one end in the bearing portion 58 of the bracket extension 57 and at its opposite end portion in a bearing 72 mounted on the transverse beam member 59 at the side of the draft tongue 15 opposite to that from which the bracket member 55 projects. Normally, the reel shaft 69 is supported in a horizontal position by a bearing element 73 which rests on the adjacent end portion of said transverse beam member 59, said bearing element having oppositely disposed apertured ears 74 which are slidably mounted on arcuate portions 75 of a pair of upstanding brackets 76 located on opposite sides of the beam member 59, and said bearing 73 being yieldably held against the beam member by springs 77 coiled around said arcuate bracket portions 75 and interposed between said ears 74 of the bearing 73 and stop collars 78 at the upper ends of said arcuate bracket portions 75.

The propeller shaft 71 is provided with a pulley 79 which is connected by a belt 80 to a driving pulley 81 provided on the counter shaft 21 of the hereinbefore described driving gear for the propeller shaft 18 of the cutter operating mechanism. By this provision the reel 66 is simultaneously rotated during the operation of the sickle bar.

In order to raise and lower the reel 66 together with the sickle bar, a collar 82 is sleeved rotatably on the shaft 69 between the two fixed thrust collars 83 and 84, said collar 82 having a cable 85 attached at one end thereto, said cable 85 extending over a pulley 86 mounted on the upper end portion of a standard 87 extending upwardly from the middle of the cross beam 59, and thence downwardly under a pulley 88 on said standard 87 and attached at its opposite end to said operating lever 50, as at 89. By this provision, when the operating lever 50 is actuated to rock the bell crank 45 so as to raise the beam 28 of the cutter mechanism, the reel shaft 69 is at the same time swung upwardly on its universal coupling 70 against the tension of the springs 77. In this connection, it is noted that the reel 66 is not only raised and lowered simultaneously with the sickle bar, but due to the flexible connection by means of the cable 85 between the collar 82 on the reel shaft 69 and said pulley 86 on the standard 87, together with the provision of the spring elements 77, the reel 66 is permitted to swing upwardly when meeting with substantial resistance from an obstacle in the path thereof and the driving belt 80 will also slip on the pulleys 79 and 81 and thereby prevent damage to the reel and its driving means.

The standard 87 may be of any desirable form and arrangement, but, as shown, it preferably comprises a pair of parallel elongated plates 90, said plates 90 having angular extensions 91 at their lower ends overlapping the opposite sides of the beam member 59 and being secured thereto by bolts 92, and in order to brace said standard 87 a diagonal stay rod 93 is extended forwardly and downwardly from the upper end of said standard and attached at its lower end to the draft tongue 15, as at 94.

Obviously, the structure may be modified in many respects without departing from the spirit of the invention as defined by the appended claims. The invention, therefore, is not limited to the specific construction and arrangements shown in the drawings.

What is claimed is:

1. In combination with a hay mowing machine or the like, including a cutting mechanism having a laterally disposed sickle bar mounted to be swingably raised and lowered, of a reel attachment including a transverse supporting beam attachable to the draft tongue of the machine, a propeller shaft mounted on said beam, said propeller shaft extending to one side of the longitudinal axis of said tongue and having a belt and pulley connection with the driving means for the cutting mechanism of the machine, the opposite end of said propeller shaft extending beyond the opposite side of said draft tongue and having a universal connection with an axial shaft of a reel, means for yieldably supporting the reel in correlation to the universal coupling of its shaft with said propeller shaft, said means including a bearing element on the reel shaft, said bearing element being slidably mounted on an arcuate guide standard on said transverse supporting beam, a spring element normally urging said bearing element downwardly on said arcuate standard, and flexibly connected means for swingably lifting the reel shaft on its universal coupling against the tension of said spring element on said arcuate standard and simultaneously lifting the sickle bar of the cutting mechanism.

2. In combination with a hay mowing machine or the like, said machine including a transversely disposed vertically swingable supporting frame, a sickle bar mounted on said supporting frame with vertically swingable movement, driving means for said sickle bar, a transverse supporting beam attachable to said mowing machine above the vertically swingable supporting frame for the sickle bar, a propeller shaft on said transverse beam, a driving connection between said propeller shaft and the sickle bar driving means, a reel having an axial shaft attached to said propeller shaft by a universal coupling, means for yieldably supporting said reel laterally from the body of the machine in working relation above the sickle bar of the cutting mechanism, spring means normally urging said reel downwardly on its support, an operating lever for raising and lowering the sickle bar, and a flexible connection between said operating lever and the reel shaft for raising the reel against the tension of said spring means simultaneously with the raising of the sickle bar.

JIM BELLEGANTE.